United States Patent Office
3,657,287
Patented Apr. 18, 1972

3,657,287
METHOD FOR PRODUCING ISOPRENOID QUINONES

Yutaka Kawamatsu and Hirosada Sugihara, Osaka, and Hiroshi Morimoto, Nishinomiya, Hyogo, Japan, assignors to Takeda Chemical Industries, Ltd., Osaka, Japan
No Drawing. Filed Oct. 15, 1969, Ser. No. 866,735
Claims priority, application Japan, Oct. 16, 1968, 43/75,365
Int. Cl. C07c *49/64, 49/66*
U.S. Cl. 260—396 K                10 Claims

ABSTRACT OF THE DISCLOSURE

Method of producing isoprenoid quinone compounds of the formula

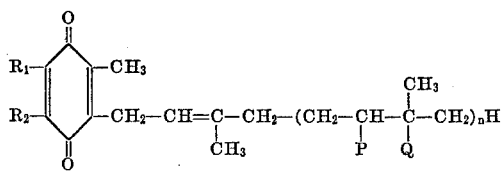

useful as vitamins or coenzymes, where $R_1$ and $R_2$ are methoxy or methyl or taken together represent $$-CH=CH-CH=CH-$$

P and Q are hydrogen atoms or taken together a double bond and $n$ is an integer of from 0 to 9, by subjecting one of the compounds of the formulae

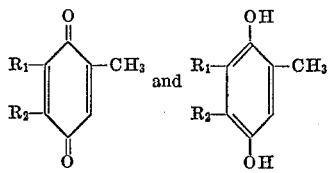

where $R_1$ and $R_2$ are as above-defined, to condensation with a compound of the formula

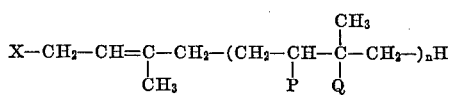

where P, Q and $n$ are as above-defined and X is halogen, in the presence of zinc amalgam or palladium and subjecting the condensation product to oxidation.

---

The present invention is concerned with a method for production of isoprenoid quinone derivatives. More concretely, the present invention relates to a method for producing isoprenoid quinone derivatives represented by the general formula

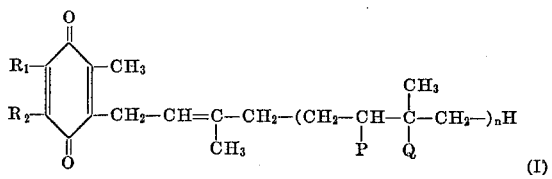

wherein each of $R_1$ and $R_2$ is methoxy or methyl, or $R_1$ and $R_2$ together represent —CH=CH—CH=CH—, P and Q each represent a hydrogen atom or, taken together, a double bond between the carbon atoms to which they are attached and $n$ is an integer from 0 to 9, which com- prises subjecting a benzoquinone or the corresponding hydroquinone of the general formula

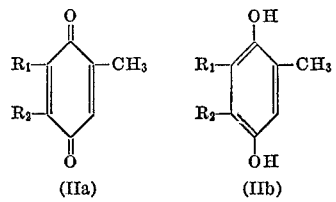

respectively, wherein $R_1$ and $R_2$ have the same meanings as defined above, to condensation with a halogenated isoprenoid represented by the general formula

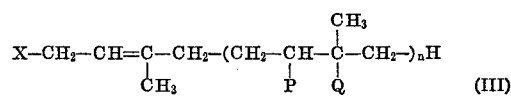

wherein P, Q and $n$ have the same meanings as defined above and X is a halogen (e.g. F, Br, Cl or I) in the presence of zinc amalgam or palladium, and then subjecting the condensation product to oxidation.

It has been known that the formation of vitamin $K_1$ can be detected when the condensation of 2-methyl-1,4-naphthoquinone and phytyl bromide is effected in the presence of zinc powder as a catalyst.

However, the hitherto-known method requires a considerably long time to carry out and affords a poor yield of vitamin $K_1$. Furthermore, the condensation is accompanied by the cyclization of the isoprenoid chain to give the corresponding chromanol compound (I)

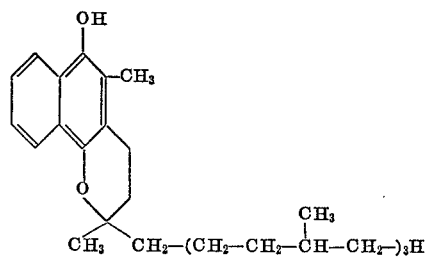

Therefore, the known method requires high cost for the isolation and purification of the objective compound from the reaction mixture, necessarily resulting in a poor yield of the objective compound.

Although many attempts were made to overcome the aforesaid shortcomings and disadvantages, so far as the present inventors are aware none was entirely successful.

It has now been found by the present inventors that zinc amalgam and palladium have excellent properties as a catalyst for the condensation between the benzoquinone (IIa) or hydroquinone (IIb) and the halogenated isoprenoid (III), providing a considerably high conversion rate and neat reaction resulting in easy purification and an elevated yield of the objective product.

Therefore, it is the principle object of the present invention to provide a novel and industrially feasible method for production of an isoprenoid quinone derivative of the general Formula I in good yield.

Another object of the present invention is to provide the isoprenoid quinone derivative (I) with high purity and relatively low cost in a short period of time.

It is to be noted that the isoprenoid quinone derivatives include ubiquinones (i.e. $R_1$ and $R_2$=$OCH_3$; P and Q, taken together, represent a double bond), α-tocopherol precursor (i.e. $R_1$ and $R_2=CH_3$; P and Q=H; $n$=3) and its analogues, vitamin $K_2$ (i.e. $R_1$ and $R_2$ together=

—CH=CH—CH=CH—

P and Q, taken together, represent a double bond) and the like, which are known to be vitamins or coenzymes and are useful as medicines or biochemical reagents.

These objects are realized by subjecting the benzoquinone (IIa) or hydroquinone (IIb) to condensation with the halogenated isoprenoid (III) in the presence of zinc amalgam or palladium ad subsequently subjecting the condensation product to mild oxidation.

The first reaction of the present invention is the condensation between the benzoquinone (IIa) or hydroquinone (IIb) and the halogenated isoprenoid (III) in the presence of zinc amalgam or palladium.

The zinc amalgam to be employed in the present invention is prepared by any of per se known preparation means, for example, by mixing mossy zinc, mercuric chloride and dilute hydrochloric acid solution in that order, and washing the mixture well with water, methanol and petroleum ether, successively, and finally drying the resulting product in air.

The palladium as an alternative catalyst in the present invention is generally employed in a form of powder.

The benzoquinone (IIa) to be employed in the present invention as a raw material is prepared by per se known means. For example, 2-methyl-1,4-naphthoquinone, 2,3,5-trimethyl-1,4-benzoquinone or 2,3-dimethoxy-5-methyl-1,4-benzoquinone is produced by mild oxidation of 2-methyl - naphthalene, 2,3,4,6 - tetramethylaniline or 2-amino-3,4,5-trimethoxytoluene, respectively.

The hydroquinone (IIb) is easily prepared by conventional techniques, for example, by catalytically reducing the benzoquinone (IIa) in the presence of a suitable catalyst, e.g. palladium, platinum or Raney nickel or by using a reducing agent, e.g. sulfur dioxide gas, sodium hyposulfite, sodium boron hydride or lithium aluminum hydride.

The halogenated isoprenoid (III) can be easily obtained by reacting an alcohol represented by the formula

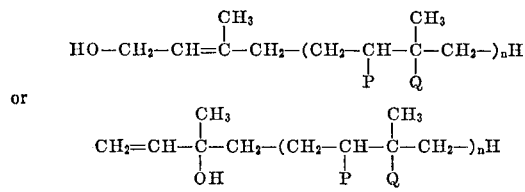

wherein $n$, P and Q each have the same meaning as defined above with a conventional halogenating agent such as phosphorous tribromide or hydrochloric acid.

The amout of halogenated isoprenoid (III) relative to the benzoquinone (IIa) or hydroquinone (IIb) should vary with other reaction conditions. However, it is preferable to employ about 1 mole to about 7 moles, more preferably about 2 moles to about 5 moles, per mole of the benzoquinone (IIa) or hydroquinone (IIb).

While the amount of zinc amalgam relative to the benzoquinone (IIa) or the hydroquinone (IIb) should vary with the type of compound (IIa) or (IIb), the type of the halogenated isoprenoid (III), the reaction temperature and the type of the solvent, it is preferable to employ about 2 moles to about 25 moles, more preferably about 5 moles to about 20 moles (based on the amount of zinc) per mole of (IIa) or (IIb).

The amount of palladium varies with the reaction conditions, but is preferably employed in an amount of about 0.5 mole to about 5 moles, more preferably about 1 mole to about 2 moles per mole of benzoquinone (IIa) or hydroquinone (IIb).

Though the reaction proceeds without a solvent, it is preferably carried out in the presence of a suitable solvent which does not disturb the reaction. Such solvents are exemplified by lower alcohols (e.g. methyl alcohol, ethyl alcohol, propyl alcohol, isopropyl alcohol, etc.), ethers (e.g. ethy ether, dioxane, tetrahydrofuran, etc.), aromatic hydrocarbons (benzene, toluene, xylene, etc.), aliphatic hydrocarbons (n-hexane, petroleum ether, etc.), alicyclic hydrocarbons (cyclohexane, etc.) or a mixture thereof.

Generally, the reaction proceeds smoothly at room temperature (about 10° C. to 30° C.). However, it may be carried out with cooling or heating so as to control the reaction velocity. In case of heating, the reaction temperature is to be kept below 80° C. in order to avoid occurrence of undesirable side reactions.

The reaction may be carried out in air, but is preferably carried out in atmosphere kept free from moisture by means of a dehydrating agent, e.g. anhydrous calcium chloride.

While the reaction time varies with the reaction conditions, generally speaking, at room temperature the reaction goes to completion after 12 to 24 hours, though it may be shortened by heating.

After the condensation reaction, the inorganic substances are removed from the reaction mixture by a conventional procedure, e.g. filtration or decantation. The resultant solution is generally submitted to the oxidation reaction. Of course, if desired, the condensation product may be isolated in a conventional manner (e.g. by extraction) and subjected to oxidation itself to obtain the isoprenoid quinone derivatve (I).

The oxidation reaction can be carried out by any of conventional means for the conversion of a hydroquinone to the corresponding quinone. Thus, use can be made of the process involving the employment of such a mild oxidizing agent as ferric chloride, manganese dioxide, silver oxide, etc. The air oxidation method is another alternative.

After completion of the reaction, the isoprenoid quinone derivative (I) can be obtained by a per se known procedure, e.g. concentration, chromatography, distillation, etc.

It should be noted that the objective compound (I) is generally obtained as a mixture of the cis-form and trans-form regarding the double bond in the β-position of the isoprenoid chain. If desired, the mixture is divided into respective isomers by per se known means, e.g. chromatography using silica gel. It is to be understood that all such individual isomers as well as mixtures thereof are included in the scope of the present invention.

The following examples will serve to illustrate the present invention without being limited thereto. In these examples, parts by weight bear the same relation to parts by volume as do grams to milliliters. The ultraviolet absorption spectrum (U.V.) is expressed in terms of $$\lambda_{max.}^{EtOH} \; (E_{1\,cm.}^{1\%})$$

EXAMPLE 1

To a solution of 182 parts by weight of 2,3-dimethoxy-5-methyl-1,4-benzoquinone in 4000 parts by volume of petroleum ether, there are added 870 parts by weight of geranyl bromide and 1000 parts by weight of zinc amalgam (prepared from 1000 parts by weight of mossy zinc, 50 parts by weight of mercuric chloride and 5000 parts by volume of a 10% aqueous hydrochloric acid solution). Kept from the light, the mixture is stirred overnight at room temperature. Inorganic substances are filtered off, and 10,000 parts by volume of ether is added to the filtrate. The ethereal solution containing the condensation product is then poured into 5000 parts by volume of a 10% aqueous solution of ferric chloride, followed by vigorous shaking. The ether layer is separated and washed three times with 5000 parts by volume each of water. After dehydration over anhydrous sodium sulfate, the ether is distilled off. The residue is subjected to column chromatography on 10,000 parts by weight of silica gel, using a 9:1 (volume/volume) mixture of n-hexane and ether as eluant. The eluate is concentrated to yield 2,3-dimethoxy - 5 - methyl-6-geranyl-1,4-benzoquinone. Yield 40% (127 parts by weight) U.V.: 275 (412).

*Elementary analysis.*—Calculated for $C_{19}H_{26}O_4$ (percent): C, 71.67; H, 8.23. Found (percent): C, 71.57; H, 8.37.

Instead of the ferric chloride treatment in the above procedure, air is passed vigorously for 2 hours through the ethereal solution containing the condensation product, to obtain the same result.

Alternatively, in the above procedure, geranyl chloride is employed in place of geranyl bromide as a raw material to produce 2,3-dimethoxy-5-methyl-6-geranyl-1,4-benzoquinone.

EXAMPLES 2 TO 10

The following results are obtained in the same procedure as in Example 1 by the use of the starting materials and catalysts as listed below:

(2) Production of 2,3-dimethoxy-5-methyl-6-phytyl-1,4-benzoquinone

Starting materials:

2,3-dimethoxy-5-methyl-1,4-benzoquinone (184 parts by weight)
Phytyl bromide (1000 parts by weight)

Catalyst: Zinc amalgam as in Example 1 (1000 parts by weight)

Yield: 58.7% (270 parts by weight)
U.V.: 275 (301).

(3) Production of 2,3,5-trimethyl-6-phytyl-1,4-benzoquinone

Starting materials:

2,3,5-trimethylbenzoquinone (150 parts by weight)
Phytyl bromide (718 parts by weight)

Catalyst: Palladium powder (100 parts by weight)

Yield: 45% (193 parts by weight)
U.V.: 267 (411)

Production of 2,3,5-trimethyl-6-geranyl-1,4-benzoquinone

Starting materials:

2,3,5-trimethylbenzoquinone (150 parts by weight)
Geranyl bromide (870 parts by weight)

Catalyst: Zinc amalgam prepared from 500 parts by wight of mossy zinc, 50 parts by weight of mercuric chloride and 500 parts by volume of 10% hydrochloric acid (500 parts by weight).

Yield: 35% (100 parts by weight)
U.V.: 267 (640)

(5) Production of 2,3-dimethoxy-5-methyl-6-phytyl-1,4-benzoquinone

Starting materials:

2,3-dimethoxy-5-methyl-1,4-hydroquinone (184 parts by weight)
Phytyl bromide (1000 parts by weight)

Catalyst: Palladium powder (100 parts by weight)

Yield: 50% (230 parts by weight)
U.V.: 275 (301)

(6) Production of 2,3-dimethoxy-5-methyl-6-geranyl-1,4-benzoquinone

Starting materials:

2,3-dimethoxy-5-methyl-1,4-hydroquinone (184 parts by weight)
Geranyl bromide (1000 parts by weight)

Catalyst: Zinc amalgam prepared from 1000 parts by weight of mossy zinc, 100 parts by weight of mercuric chloride and 5000 parts by weight of 10% aqueous hydrochloric acid solution (1000 parts by weight)

Yield: 57.8% (184 parts by weight)
U.V.: 275 (412)

(7) Production of 2,3,5-trimethyl-6-phytyl-1,4-benzoquinone

Starting materials:

2,3,5-trimethyl-1,4-hydroquinone (152 parts by weight)
Geranyl bromide (434 parts by weight)

Catalyst: Zinc amalgam as in Example 1 (1000 parts by weight)

Yield: 40% (115 parts by weight)
U.V.: 267 (640)

(8) Production of 2,3,5-trimethyl-6-phytyl-1,4-benzoquinone

Starting materials:

2,3,5-trimethyl-1,4-hydroquinone (152 parts by weight)
Phytyl bromide (1000 parts by weight)

Catalyst: Palladium powder (100 parts by weight)

Yield: 30% (129 parts by weight)
U.V.: 267 (411)

(9) Production of 2-methyl-3-phytyl-1,4-naphthoquinone

Starting materials:

2-methyl-1,4-naphthohydroquinone (174 parts by weight)
Phytyl bromide (1000 parts by weight)

Catalyst: Zinc amalgam as in Example 1 (1000 parts by weight)

Yield: 50% (225 parts by weight)
U.V.: 248 (401)

(10) Production of 2-methyl-3-geranyl-1,4-naphthoquinone

Starting materials:

2-methyl-1,4-naphthohydroquinone (174 parts by weight)
Geranyl bromide (870 parts by weight)

Catalyst: Palladium powder (100 parts by weight)

Yield: 40% (123 parts by weight)
U.V.: 248 (400)

EXAMPLE 11

Column chromatography is carried out on 80 parts by weight of trans/cis mixture of 2,3-dimethoxy-5-methyl-6-phytyl-1,4-benzoquinone. The column is packed with 15,000 parts by weight of silica gel and n-hexane/ether (20:1 volume/volume) is used as the eluant. From the fractions corresponding to the eluates of from 100,000 to 130,000 parts by volume, 10 parts by weight of cis-2,3-dimethoxy-5-methyl-6-phytyl-1,4-benzoquinone is recovered. Then, from the fractions of from 150,000 to 230,000 parts by volume, 69 parts by weight of trans-2,3-dimethoxy-5-methyl-6-phytyl-1,4-benzoquinone is obtained.

In the same manner, except utilizing n-hexane/ether (100:1 volume/volume) as the eluant, 176 parts by weight of a trans/cis mixture of 2,3,5-trimethyl-6-phytyl-1,4-benzoquinone is subjected to separation to give 10 parts by weight of cis-2,3,5-trimethyl-6-phytyl-1,4-benzoquinone and 110 parts by weight of trans-2,3,5-trimethyl-6-phytyl-1,4-benzoquinone.

Similarly, 70 parts by weight of a trans/cis mixture of vitamin $K_1$ is separated into 8 parts by weight of cis-vitamin $K_1$ and 60 parts by weight of trans-vitamin $K_1$ by the use of n-hexane/ether (100:1 volume/volume) as the eluant.

What is claimed is:
1. A method of producing a compound of the general formula

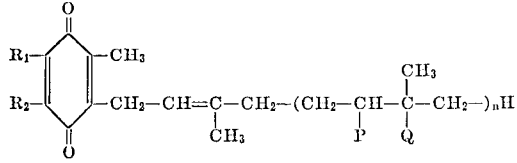

wherein each of $R_1$ and $R_2$ is a methoxy or methyl group or $R_1$ and $R_2$ together represent —CH=CH—CH=CH, P and Q each represent a hydrogen atom or together a double bond between the carbon atoms to which they are attached and $n$ is an integer from 0 to 9 which comprises condensing a benzoquinone of the general formula

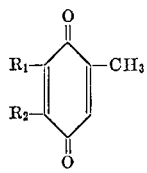

or the corresponding hydroquinone of the general formula

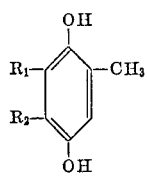

wherein each of $R_1$ and $R_2$ has the meaning as defined above with a halogenated isoprenoid of the general formula

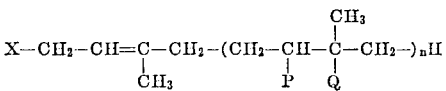

wherein

P, Q and $n$ have the meaning as defined above and X is a halogen atom at a temperature below 80° C. in the presence of a catalyst selected from the group consisting of zinc amalgam and palladium and oxidizing the resultant condensation product in the presence of a mild oxidizing agent.

2. A method as claimed in claim 1 wherein each of $R_1$ and $R_2$ is a methyl group.

3. A method as claimed in claim 1 wherein each of $R_1$ and $R_2$ is a methoxy group.

4. A method as claimed in claim 1 wherein $R_1$ and $R_2$ together represent —CH=CH—CH=CH—.

5. A method as claimed in claim 1 wherein P and Q together represent a double bond between the carbon atoms to which they are attached.

6. A method as claimed in claim 1 wherein each of P and Q is a hydrogen atom.

7. A method as claimed in claim 1 wherein the halogenated isoprenoid is phytyl bromide.

8. A method as claimed in claim 1 wherein the halogenated isoprenoid is geranyl bromide.

9. A method as claimed in claim 1 wherein the catalyst is zinc amalgam and said catalyst is utilized in an amount of from 2 to 25 moles per mole of benzoquinone or hydroquinone.

10. A method as claimed in claim 1 wherein the catalyst is palladium and said catalyst is utilized in an amount of from 0.5 to 5 moles per mole of benzoquinone of hydroquinone.

References Cited
UNITED STATES PATENTS 3,080,384  3/1963  Kofler et al. .......... 260—396
3,118,914  1/1964  Gloar et al. .......... 260—396

LORRAINE A. WEINBERGER, Primary Examiner

V. GARNER, Assistant Examiner

U.S. Cl. X.R.

252—475; 260—345.5, 396 R